(No Model.)
W. H. FULLER.
CULTIVATOR.
No. 397,075. Patented Jan. 29, 1889.
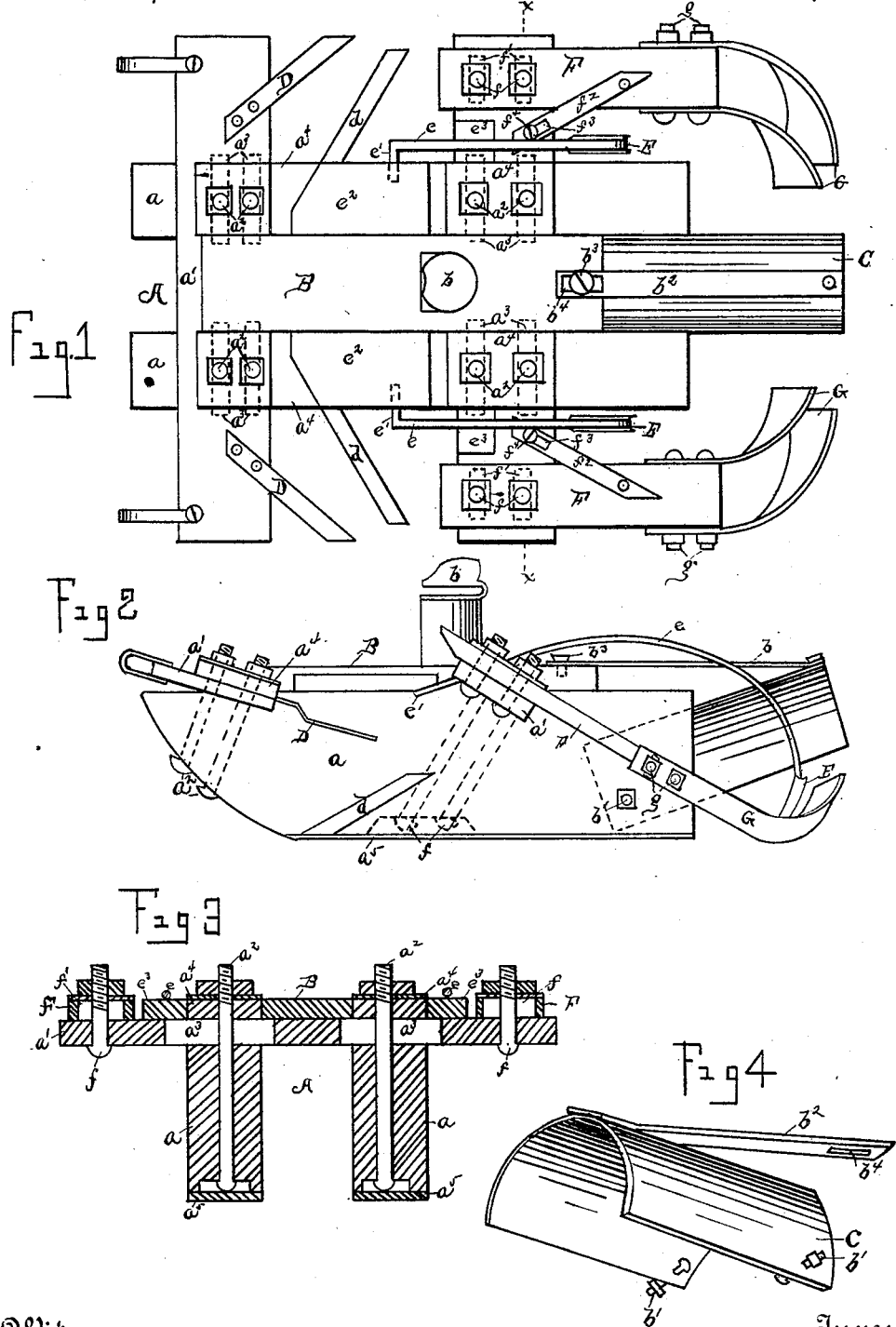
Witnesses,
Wm. S. Hodges
U. Perkins
Inventor,
William H. Fuller,
By Patrick O'Farrell,
Attorney.

UNITED STATES PATENT OFFICE.

WILLIAM H. FULLER, OF BLADEN, NEBRASKA.

CULTIVATOR.

SPECIFICATION forming part of Letters Patent No. 397,075, dated January 29, 1889.

Application filed October 11, 1888. Serial No. 287,838. (No model.)

*To all whom it may concern:*

Be it known that I, WILLIAM H. FULLER, a citizen of the United States of America, residing at Bladen, in the county of Webster and State of Nebraska, have invented certain new and useful Improvements in Cultivators, of which the following is a specification, reference being had therein to the accompanying drawings.

This invention pertains to certain new and useful improvements in cultivators, and it comprises the details of construction, combination, and arrangement of parts, substantially as hereinafter fully set forth, and particularly pointed out in the claims.

In the accompanying drawings, Figure 1 is a plan view of my improved cultivator. Fig. 2 is a side view thereof. Fig. 3 is a cross-section on the line $x\,x$, Fig. 1. Fig. 4 is a detail perspective view.

This invention relates to cultivators.

Referring to the drawings, A designates the sled or cultivator frame, composed of two runners, $a\,a$, connected together by inclined transverse bars $a'\,a'$. The runners are rendered adjustable by means of nutted bolts $a^2\,a^2$, passed through apertures thereof and through slots $a^3\,a^3$ of bars $a'$. The upper ends of these bolts are passed through apertured blocks $a^4$, whereon bear the washers against which the nuts rest. The runners are preferably provided on their under surfaces with steel plates $a^5$, and the same protect the heads of the rearmost bolts, $a^2$. The bars $a'\,a'$ are connected together by a central bar, B, whereon is mounted the driver's seat $b$.

C is a shield composed, preferably, of a piece of sheet metal, and is bent into an approximately U shape. The same is pivotally connected by nutted bolts $b'$ to the inner sides of runners $a\,a$, and is held in a rearwardly-inclined position by means of a strap or iron bar, $b^2$, connected thereto at its outer end, and to the bar B by means of a screw, $b^3$, passed through a slot, $b^4$, in said strap or bar. By this means the shield is rendered adjustable. To the front cross-bar, $a'$, are connected two outwardly-projecting knives, D D, for cutting big weeds, and to the under edges of runners $a$ are secured two more knives, $d\,d$, for cutting weeds at or near their roots.

E E are two cultivator-shovels, preferably curved or bent in the manner shown, and their drag-bars $e\,e$ are suitably bent and their forward-right angular ends $e'$ are inserted in suitable apertures in blocks $e^2$, secured to runners $a$. These drag-bars rest upon short blocks $e^3\,e^3$, attached to the rear cross-bar, $a'$.

To cross-bar $a'$ are connected inclined rearwardly-projecting bars F F, adjustably held by nutted bolts $f\,f$, passed through bar $a'$ and slots $f'\,f'$ of said bars F. To these bars are connected adjustable brace-plates $f^2$, through slots $f^3$ of which screws $f^4$ are passed and screwed into bar $a'$. Curved leveling plates or arms G G are connected by nutted bolts $g\,g$ to each bar F and project at their outer ends toward the center of the cultivator.

It will be understood that the cultivator-shovels plow the ground on either side of the row of corn over which the shield C passes, said shield being adjustable for different-height corn, and that the leveling plates or arms level the soil between the rows of corn.

By making the shield C of inverted-U shape and securing the inner end thereof to each runner $a$, the same permits of the adjustment of said runners the desired extent, since it will readily expand, as is obvious.

I claim as my invention—

1. The combination of the adjustable runners, the front and rear cross-bars having slots, the nutted bolts $a^2$, the shield of approximately U shape, the nutted bolts $b'$, securing the same to said runners, the strap or bar secured at its rear end to said shield and having a slot in its forward end, and the nutted bolt $b^3$, substantially as set forth.

2. The combination, with the adjustable runners, the slotted cross-bars, and the shield, of the inclined cross-bars, the inclined rearwardly-projecting bars having slots, the nutted bolts passed therethrough, the brace-plates $f^2$, having slotted ends, the screws $f^4$, and the leveling plates or arms G, substantially as set forth.

In testimony whereof I affix my signature in presence of two witnesses.

WILLIAM H. FULLER.

Witnesses:
D. B. SPANOGLE,
C. F. CATHER.